A. F. SALLÉ.
MEANS FOR PRODUCING THEATRICAL EFFECTS.
APPLICATION FILED MAR. 1908.

922,722.

Patented May 25, 1909.
2 SHEETS—SHEET 1.

A. F. SALLÉ.
MEANS FOR PRODUCING THEATRICAL EFFECTS.
APPLICATION FILED MAR. 21, 1908.

922,722.

Patented May 25, 1909.
2 SHEETS—SHEET 2.

UNITED STATES PATENT OFFICE.

ANTOINE FRANCOIS SALLÉ, OF PARIS, FRANCE.

MEANS FOR PRODUCING THEATRICAL EFFECTS.

No. 922,722.	Specification of Letters Patent.	Patented May 25, 1909.

Application filed March 21, 1908. Serial No. 422,528.

*To all whom it may concern:*

Be it known that I, ANTOINE FRANCOIS SALLÉ, of 25 Rue Henri Monnier, Paris, France, engineer, have invented a new and useful improvement in Means for Producing Theatrical Effects, which improvement is fully set forth in the following specification.

The object of this invention is to replace in a small theater marionettes properly so called by the reflected image of an actual human figure reduced to the proportions of a marionette. This result is obtained by the combination of a concave mirror and additional mirrors so arranged that the combined system produces an image of a human being in its proper position.

It is well known that when an object is placed before a concave mirror in front of the principal focus, a reduced and inverted image of this object is formed in the space in front of the focus, this image is called a "real image." By combining this concave mirror with an additional arrangement of mirrors placed so as to present to the concave mirror an inverted image of the figure which is to appear reduced, the said figure will be obtained reduced in the proper position of the usual figure. For example two plane mirrors forming between them a fixed angle and suitably inclined to the optical axis of the concave mirror will produce the desired inversion of the image. A concave mirror can be used as the auxiliary inverting mirror. Distorting mirrors to give comic effects may also be used. As the reduced image obtained by the complete optical system as described is real there is no need to project it onto a special screen in order that it may be seen, but this however may be done in certain cases in order to combine the reduced image with decorative or scenic effects.

Figure 1:
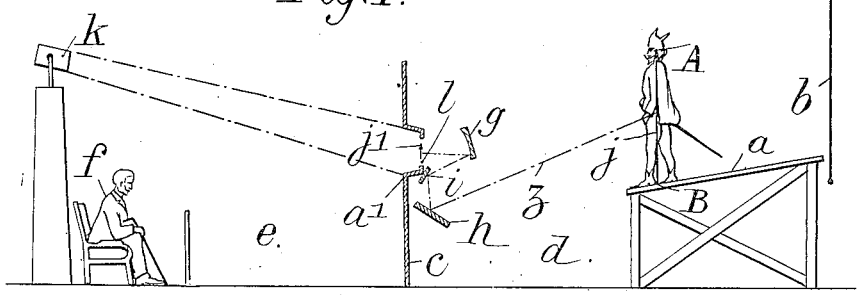
Figure 2:
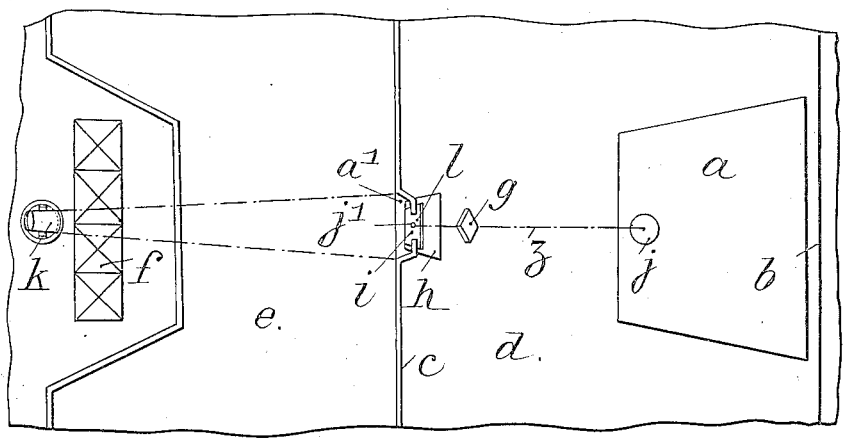
Figure 3:
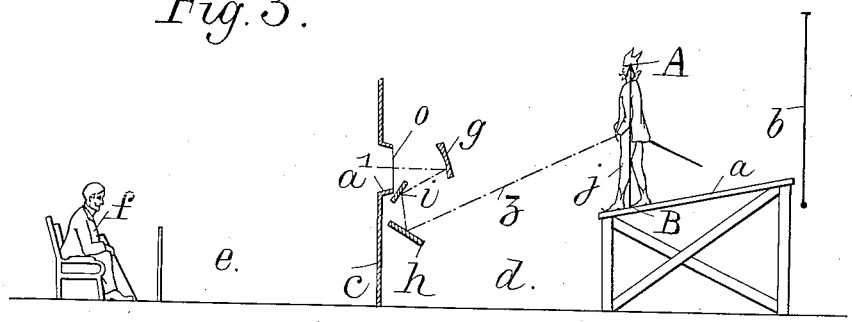
Figure 4:
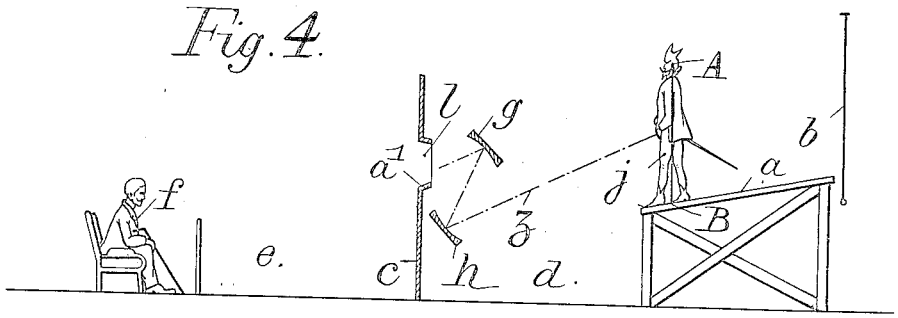
Figure 5:
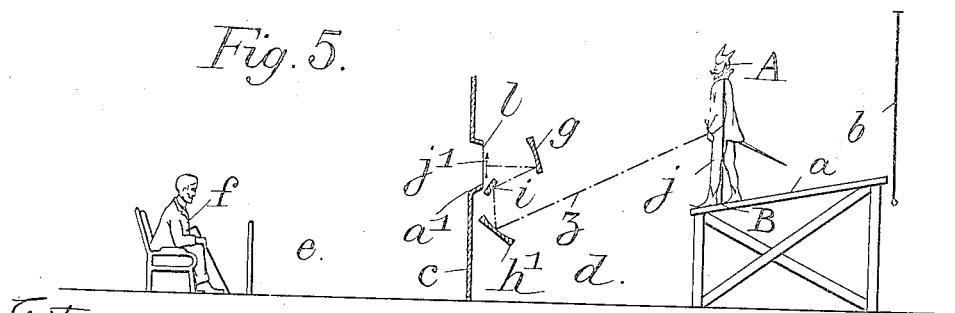

In the drawing which illustrates this invention: Figure 1 is a longitudinal section showing a theater of living marionettes constructed according to this invention. Fig. 2 is a plan view of it. Figs. 3, 4 and 5 are views similar to Fig. 1 showing modifications.

As seen in the drawing, the theater consists of a main stage $a$ having a background $b$ and a small stage $a^1$ provided in a screen $c$ which separates the auditorium $e$ in which are the spectators $f$ from the space $d$ behind the screen.

In the space $d$ near the screen $c$ is arranged an optical system consisting of a concave mirror $g$ having a spherical reflecting surface and two preferably plane mirrors $h$ and $i$ forming between them an angle of 90° and inclined at exactly 45° to the optical axis of the mirror $g$. In the arrangement shown the mirror $h$ is at an angle of 30° with the horizontal which in practice gives a good result. If a person, for example, an actor $j$ is on the stage $a$ his image will be reflected firstly upon the mirror $h$, secondly upon the mirror $i$ and will thus be thrown inverted on the concave mirror $g$ as can be seen by following the path of the luminous rays $z$ coming from the actor $j$ (or of the arrow A B which is substituted for him for greater clearness in the drawing). The mirror $g$ will throw in front of its principal focus the image which the mirror $i$ has reflected to it, but this image will be reduced and again inverted, and will consequently be erect. It is the image $j^1$ which appears on the small stage $a^1$ to the spectators $f$. The background $b$ and the scenery will be seen by the same optical effect in their proper position erect on the stage $a^1$.

In order that the reduced images may retain all the brightness which gives them a special charm, the auditorium $e$ is kept dark while the stage is brilliantly lighted by an arrangement which does not allow any light to reach the auditorium $e$ and spoil the effect. Projectors, such as $k$, may also be placed in the auditorium which, while leaving the spectators in darkness, facilitate the regulation (which should be perfect) of the lighting of the large and small stages.

In order to allow of the passage of the luminous rays, the screen $c$ is provided just above the small stage $a^1$ with an aperture $l$ which is at least as large as the reduced figure. In practice this aperture is not seen for the floor of the large stage and that of the small appear in the same plane and blend absolutely.

If the scene painter has joined the scenery of the large and small stages well, taking into account the difference in scale and if the lighting is well regulated, the illusion is complete. The spectator only sees a small theater in the middle of which is a small human marionette of a size calculated by the maker, and it is impossible to guess that there is a hole in the screen.

The reduced image $j^1$ may be received on an appropriate diaphane surface $o$. Under these conditions it is only necessary that the actor keep in a plane parallel to this surface in order that his reduced image may not leave the plane of the said surface.

Instead of two plane mirrors, such as $h$ and $i$, a single concave mirror $n$ (Fig. 4) may be used as the auxiliary inverting mirror to invert the image and send it into the concave mirror $g$.

If a curved mirror, as $h^1$ in Fig. 5, be substituted for the plane mirror $h$, a distorted image of the actor may be produced on the stage $a^1$.

Having now particularly described and ascertained the nature of my said invention and in what manner the same is to be performed, I declare that what I claim is:

1. The combination of a stage, a concave mirror in advance of the stage, means for reflecting into said mirror an inverted image of an actor upon the stage, and a miniature stage at such a point in advance of the said mirror that a real image of the actor will be formed thereat by the mirror.

2. The combination of a concave mirror, a stage behind said mirror, means for reflecting into the mirror an inverted image of an actor upon the stage, a screen in front of the mirror having an opening, and a miniature stage in said opening at such a point in advance of the mirror that a real image of the actor will be formed thereat by the mirror.

3. The combination of a main stage, a concave mirror in front of the stage, a miniature stage in front of the mirror in the same horizontal plane as the main stage, an angularly disposed mirror below the concave mirror to reflect into the same an inverted image of an actor upon the main stage, and an opaque screen in front of the concave mirror having an opening around the miniature stage, the said miniature stage being located at such a point in advance of the concave mirror that a real image of the actor will be formed thereat by the mirror.

In testimony whereof I have signed this specification in the presence of two subscribing witnesses.

ANTOINE FRANCOIS SALLÉ.

Witnesses:
 HANSON C. COXE,
 LOUIS FRÉDÉRIC HARLÉ.